G. ATHERTON.
Horse Hay-Forks.
No. 136,016. Patented Feb. 18, 1873.
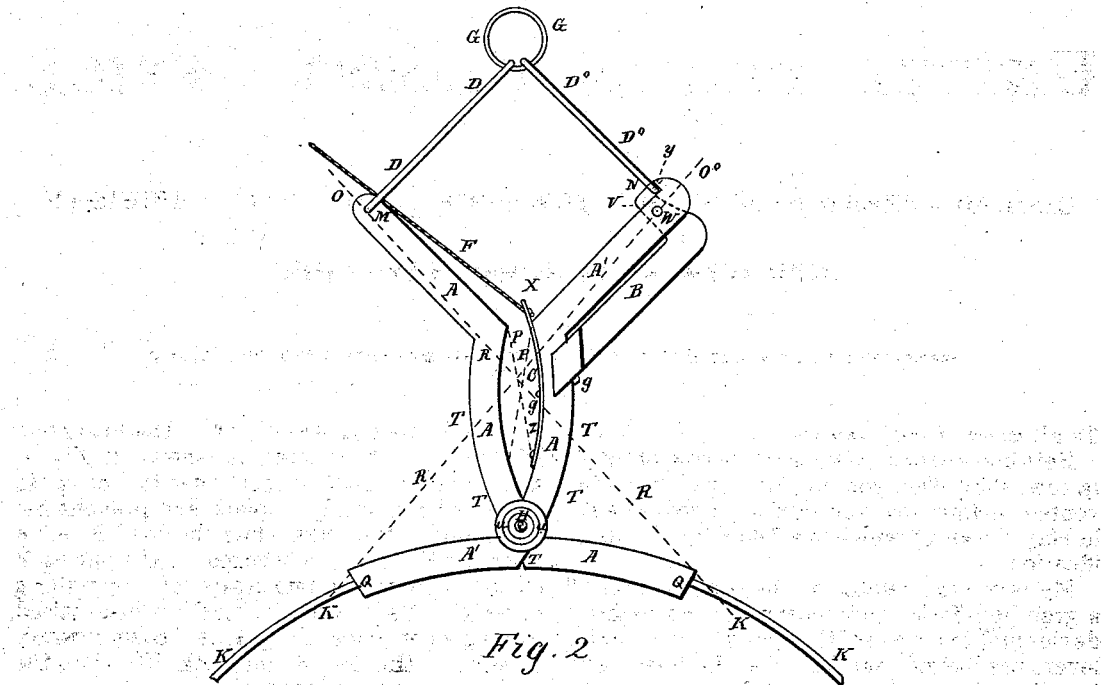
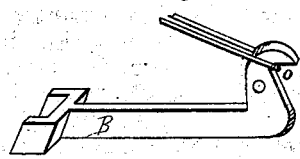
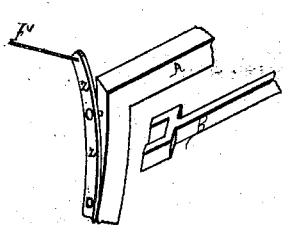
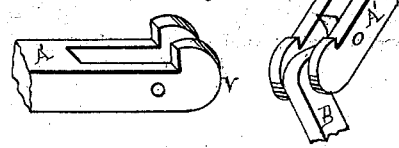
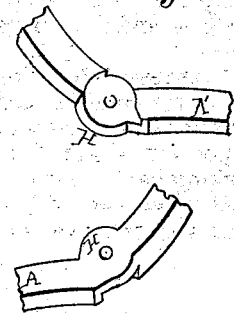
Witnesses
A B Frost
Andrew Mitchell
Inventor
George Atherton

UNITED STATES PATENT OFFICE.

GEORGE ATHERTON, OF SPARTA TOWNSHIP, KENT COUNTY, MICHIGAN.

IMPROVEMENT IN HORSE HAY-FORKS.

Specification forming part of Letters Patent No. 136,016, dated February 18, 1873.

To all whom it may concern:

Be it known that I, GEO. ATHERTON, of Sparta township, Kent county, Michigan, have invented certain new and useful Improvements in Hay-Forks, of which the following is a specification:

My invention relates to the construction of a grab hay-fork; and consists in the locking device pivoted to one of the levers, by which the levers are locked together after the tines have been inserted in the hay, and the load is ready to be raised.

Figure 1 is a side elevation of my invention. Figs. 2, 3, 4, and 5 are detail views of the various parts.

A A' represent the two levers, pivoted together at the point H, and having the double spring-tines K secured to their lower ends. To the upper part of one of these levers is pivoted the locking-bar B, having the hook E formed upon its upper end, which, operating with the shoulder $y$ on the lever A', forms a secure lock for the connecting-links D D⁰. The lower end of this bar is bifurcated, as shown in Fig. 2, and which is made to lock over the pin $g$, so as to be held rigidly in place and prevent the loosening of the links while the load is being raised. The pin $g$ is secured to the spring Z so as to operate automatically, and by pulling upon the rope F, after the load has been raised to its proper place, the pin is drawn inward, unlocking the bar B and links D, when the load is instantly released.

Having thus described my invention, what I claim as new, and desire to secure by Letters Patent, is—

The combination of the levers A A', locking devices B $g$ Z, rope F, and tines K, when arranged to operate substantially as described.

GEORGE ATHERTON. [L. S.]

Witnesses:
    A. B. FROST,
    ANDREW WHITRELL.